UNITED STATES PATENT OFFICE.

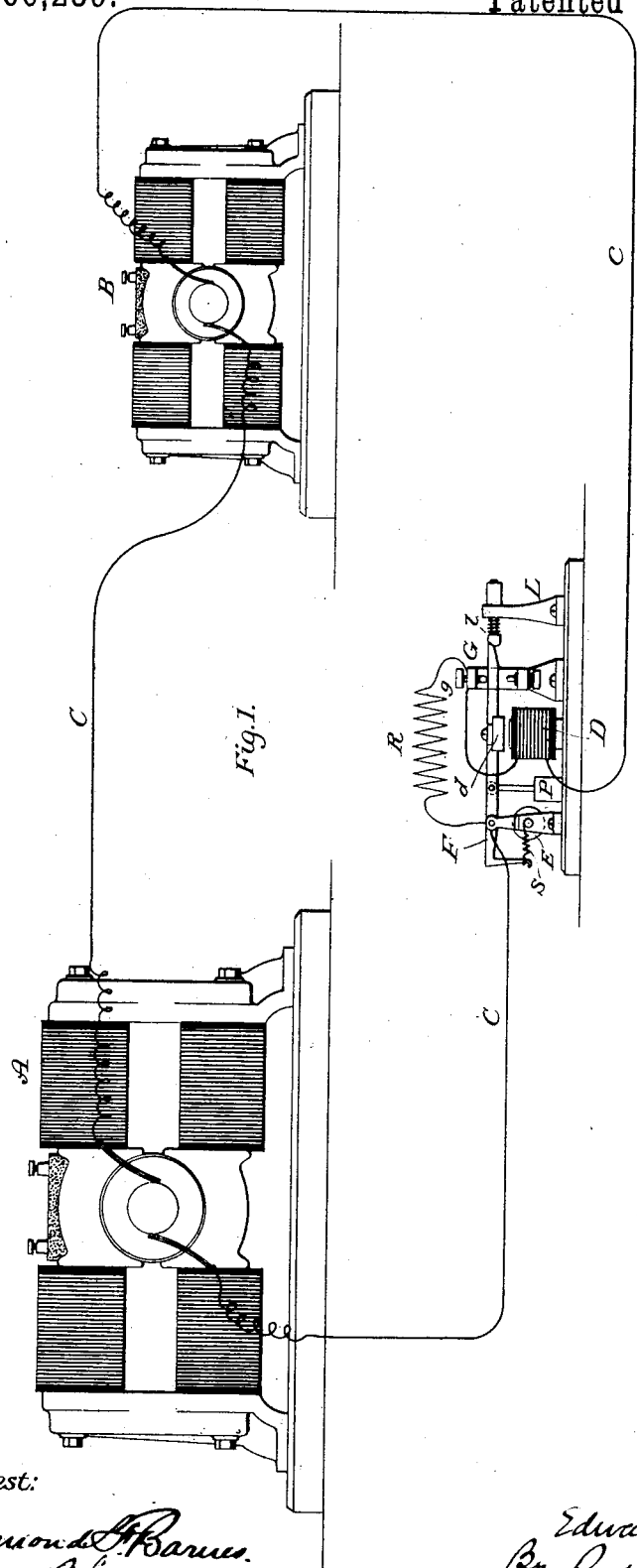

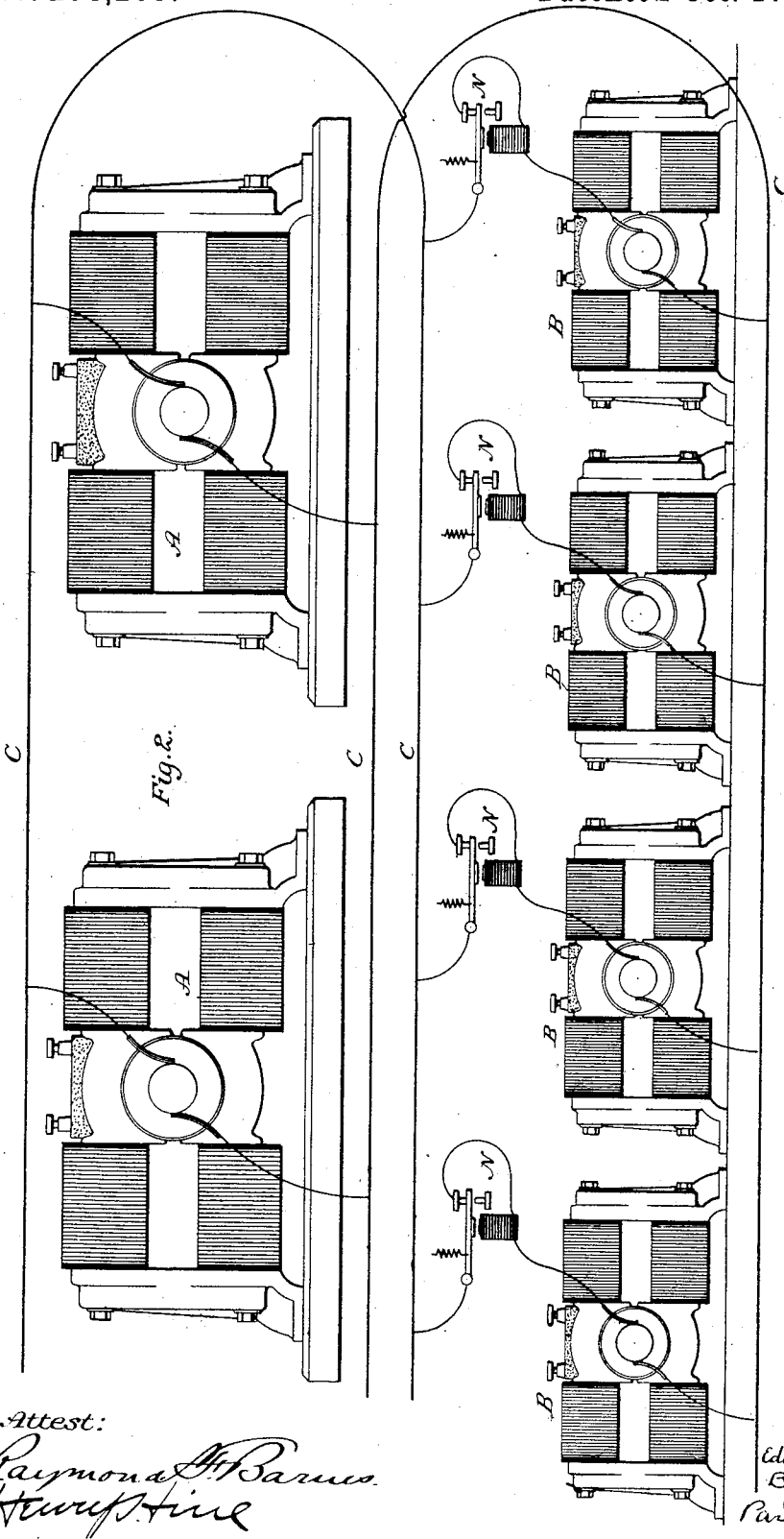

EDWARD WESTON, OF NEWARK, NEW JERSEY, ASSIGNOR TO THE UNITED STATES ELECTRIC LIGHTING COMPANY, OF NEW YORK, N. Y.

SYSTEM FOR THE ELECTRICAL TRANSMISSION OF POWER.

SPECIFICATION forming part of Letters Patent No. 266,239, dated October 17, 1882.

Application filed May 8, 1882. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Systems for the Electrical Transmission of Power, of which the following is a specification.

When an electro-magnetic motor is included in the circuit of a dynamo or magneto electric generator there is developed by the former an electro-motive force opposed to that of the generator varying in degree with the rate of speed at which the motor is driven. This counter electro-motive force in a certain sense acts in the same manner as a resistance, and may be regarded for practical purposes as resistance inserted in the circuit, since it determines the amount of current flowing over the line. In any given case, assuming the electro-motive force of the generator to remain practically constant, the speed of the motor will be reduced according to the load imposed upon it. Hence it follows that the greater the load of the motor the greater the amount of current passing over the line. This fact I have taken advantage of to prevent heating or burning of the motor-coil in case the motor be overloaded, suddenly stopped, or in any way prevented from rotating during the passage through it of the current.

The invention is applicable to the case of a single motor included in the circuit of a generator, or of any number of motors included in multiple-arc or branch circuits in a general system of electrical transmission and distribution of power; and its consists broadly in the combination, with a circuit containing a motor or motors and generator, of a retarded circuit-breaker or its mechanical equivalent, so constructed and arranged that it will be brought into action whenever the speed of the motor has been reduced beyond a prescribed limit, or, in other words, when the counter electro-motive force of the motor has been sufficiently lowered to permit the passage of a current on the line that exceeds a predetermined amount.

The apparatus by means of which this object is accomplished may be very greatly varied in mechanical detail and mode of operation without departure from the same general principle. For example, I may employ in the main line connecting a generator and motor an electro-magnet in conjunction with an adjustable armature constituting or operatively connected with a circuit-breaker, by means of which the circuit is interrupted as soon as an amount of current flows that exceeds a limit predetermined by the adjustment of the armature. On the other hand the electro-magnet may be included in a derived circuit between the conductors of the line, the armature in this event being arranged to normally interrupt the continuity of the line. Here the adjustment is such that so long as the motor produces the proper degree of counter electro-motive force sufficient current will be diverted through the derived circuit to energize the magnet and keep the armature in a position to complete the circuit. Should the counter electro-motive force, however, fall beyond the normal limit, the increased flow of current over the line, and consequent reduction of that in the derived circuit, renders the magnet incapable of longer holding the armature, which, in obedience to the force of a spring, breaks the main circuit. In either of the above-described arrangements the circuit, in lieu of being entirely interrupted, may be practically so by the introduction of a resistance; or many other alterations of a similar kind may be made in the construction and mode of operation of the apparatus described.

My present application, so far as the specific character of the device is concerned, relates to the first of the devices above described, the others having been made the subject of other applications for Letters Patent.

In the drawings, Figure 1 illustrates the general character and arrangement of the invention as applied to a circuit containing a single motor. Fig. 2 illustrates a system containing a number of motors, to each one of which is applied a circuit-breaker of the kind described.

In Fig. 1, A represents the dynamo-electric generator; B, the motor, and C C the conductors with which they are connected. With one of said conductors is connected an electro-magnet, D, in face of the poles of which is an armature, d, carried by a pivoted lever, F. An adjusting-screw, E, and spring S determine the force necessary for drawing down the armature. In a standard, G, are stops, the lower one insulated from the standard. L is an upright, through which extends a spring-plug, l, having a beveled end, and serving as a catch. A dash-pot, P, with a tightly-working piston, is connected to the lever to prevent it from vibrating or from being moved too suddenly. The lever F forms part of the circuit. One end of the magnet-coil is made fast to the upper contact-stop, g, of standard G, and the other is joined to line. A resistance, R, is connected with opposite sides of the apparatus. Normally the lever G presses against the stop g, being held against it by the tension of spring S and the beveled end of the plug l. When the circuit through the motor is closed it will not affect the apparatus, even though closed suddenly, unless the motor be overloaded, as the dash-pot prevents a sudden separation of the points of contact, and the motor attains very rapidly a sufficiently-high rate of speed. Should the motor be at any time after this overloaded its speed will be correspondingly reduced, and also the counter electro-motive force. The increased flow of current over the line which follows this will, when the limit of adjustment is reached, draw down the lever G with such force as to lock it under the catch l. The circuit is by this means practically broken, the resistance R forming the only remaining path for the current. The same apparatus may be applied to a branch circuit containing a motor in a general system of distribution of power.

Referring to Fig. 2 in illustration of this plan, assume that A A are the generators located at a station; C C, the circuit leading therefrom, and B B a number of motors placed at different points along the line and connected up in multiple arc. In each branch containing a motor is an electro-magnetic cut-off, N, constructed as above described. It is evident that no motor in a system thus arranged can be given more than a fixed amount of work to perform.

This apparatus forms an important feature in systems of transmission of power, for the reason that in electrical, as well as in other, systems of this kind it is usual to furnish subscribers with certain amounts of power. With electro-magnetic motors there is difficulty in limiting the amounts distributed, and it has been found that subscribers are apt to impose upon the motors in their care more work than they are capable of performing. As a consequence the motors are frequently overloaded, and sometimes destroyed by the excess of current which passes through them. With devices operating as above set forth, however, a check is set to a misuse of the motors, while other important and useful results of a similar nature are accomplished—as, for example, the rupture of the circuit in case a motor is accidentally checked by a defective journal, or otherwise. A practicable manner of using these devices is to place one in a lock-box in the vicinity of each motor. Overloading of the latter will thus be followed by a rupture of the circuit. Other ways of applying the same devices to like purposes are possible, but will readily suggest themselves.

As stated above, I do not desire to limit myself to the specific character of the devices herein described. As an illustration, I would state that I regard as the mechanical equivalent of the apparatus which is herein described and shown a well-known form of circuit-breaker, consisting of an expansible wire in the circuit, which, on a predetermined fall of the counter electro-motive force, and consequent increase in the flow of current, operates to break the circuit. So, too, the electro-magnet and armature may be supplanted by any proper form of helix and core; or many other variations in the character of the circuit-breaker may be made.

I am aware that circuit-breakers for preventing an abnormal flow of current on a line are in themselves not new, and such devices I do not claim, broadly. I am not aware, however, that a circuit-breaker or its equivalent has heretofore been used in manner and form as hereinbefore set forth.

What I claim as of my invention is—

1. In a system for the transmission of power by electricity, the combination of a dynamo or magneto electric machine, an electric motor, a retarded circuit including the same, and a circuit-breaker inserted in said circuit and constructed or arranged to interrupt the continuity of the circuit upon a predetermined fall of the counter electro-motive force produced by the motor, as set forth.

2. In a system for the transmission of power by electricity, the combination of a dynamo or magneto electric machine or a group of machines located at a central station, a circuit for conveying the current generated by the same to distances, two or more electric motors connected with said circuit in multiple arc, and retarded circuit-breakers included in the motor-circuits, the said circuit-breakers being constructed or arranged to interrupt the continuity of the motor-circuits upon a predetermined fall of the counter electro-motive force produced by the motors, as set forth.

3. The combination, with a dynamo-machine, a motor, and conductors connecting the same, of an electro-magnet included in the said circuit, an adjustable armature for the magnet, a dash-pot connected with the armature, a catch for holding the armature when attracted toward the magnet, and contact-stops, forming, in connection with the magnet and armature, a circuit-interrupter, as described.

In testimony whereof I have hereunto set my hand this 3d day of May, 1882.

EDWARD WESTON.

Witnesses:
HENRY A. BECKMEYER,
R. F. BARNES.